Figures 1, 2:
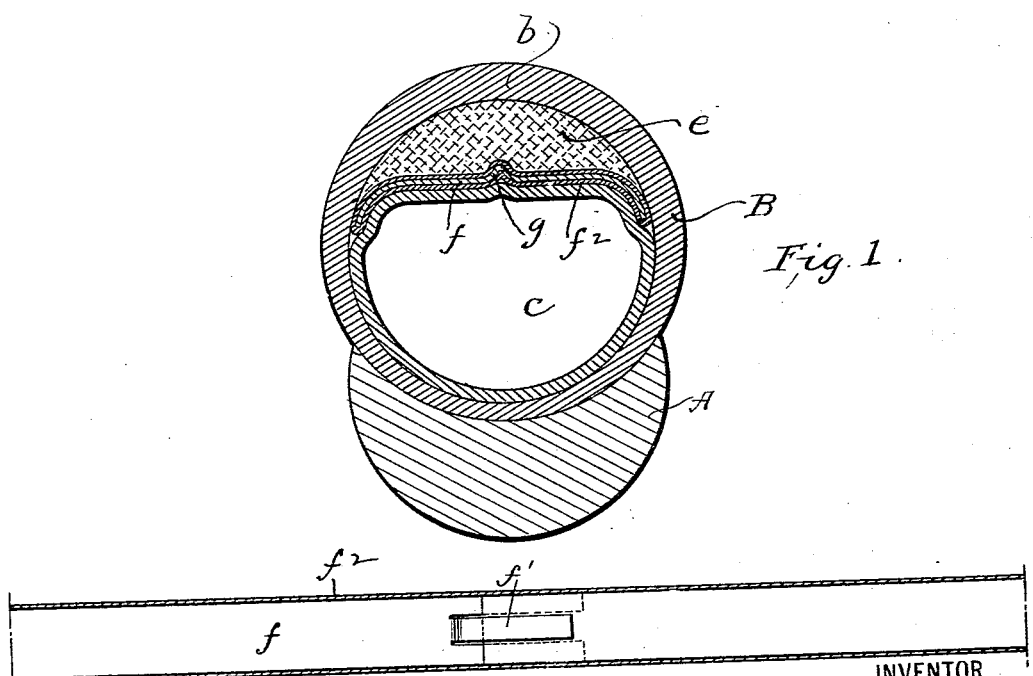

(No Model.)

A. L. SMITH.
PUNCTURE PROOF TIRE.

No. 557,709. Patented Apr. 7, 1896.

WITNESSES:

INVENTOR
Abram L. Smith
BY
ATTORNEY

UNITED STATES PATENT OFFICE.

ABRAM L. SMITH, OF BROOKLYN, NEW YORK, ASSIGNOR, BY MESNE ASSIGNMENTS, TO THE LONG ISLAND RUBBER AND CYCLE COMPANY.

PUNCTURE-PROOF TIRE.

SPECIFICATION forming part of Letters Patent No. 557,709, dated April 7, 1896.

Application filed November 20, 1895. Serial No. 569,596. (No model.)

*To all whom it may concern:*

Be it known that I, ABRAM L. SMITH, a citizen of the United States, residing at Brooklyn, in the county of Kings and State of New York, have invented certain new and useful Improvements in Puncture-Proof Tires, of which the following is a full, clear, and exact description.

This invention relates to means for preventing the puncturing of pneumatic wheel-tires by sharp bodies, such as tacks or pieces of glass, passing through the tread of the wheel.

The object of the invention is to provide a construction which will embody the puncture-proof devices in a simple, cheap, light, and effective form. This is accomplished by placing against the inner side of the tire, opposite the tread, a filling of puncture-proof material—such as compressed cotton, asbestos, or other fibrous material impregnated with rosin or otherwise treated—and backing up this filling with a substantially flat metal band or strip which extends across the interior of the tire at a point just inside of its diameter. This band is preferably constructed in sections with overlapping ends, which are free to slide upon each other to correspond to the flattening or "give" of the tire upon the road when in use.

The invention will be described in detail with reference to the accompanying drawings, in which—

Figure 1 is a cross-section of the pneumatic wheel-tire and rim, showing my puncture-proof device in position. Fig. 2 is a plan of the puncture-proof strip or band, showing one of the joints.

Referring to the drawings by letter, A represents the rim of the wheel, B the ordinary tire, and c the space occupied by the inflation-tube.

The tire is made a little thicker on the tread b than on the other parts, as usual, and inside of the tire and against the tread I place a filling e of material such as asbestos, cotton, or other fibrous material, preferably compressed to give it hardness and body and, if desired, treated with rosin or shellac to add to its puncture-proof qualities. Against this filling, which occupies nearly one-third of the space inside of the tire, I place a puncture-proof band or strip $f$. This may be a continuous band if desired; but I prefer to make it in sections of two or more to the wheel, about four sections being the best number. This band is preferably made of aluminium, as that is very tough and light, and is inclosed in an envelop of textile material, such as cloth, and is cemented against the filling in the manner shown in the figures. The width of this band is such as to extend from one side to the other of the tire at a point just inside of the horizontal diameter of the tire, or about one-third of the distance from the tread to the wheel-rim. At this point the band will form practically an armor for one-half of the tire. The filling e is used to form a backing or rest for the band and should be of as light a material as possible. By using a filling in this manner I am enabled to utilize a substantially flat band, which I could not do if the band rested against the tread of the tire, as it would then have to be curved to fit the shape of the tire, and a band curved to that extent would not be as resilient as the flat band. Hence I gain a distinct advantage in using the filling in combination with the flat band.

The band is shown with a central rib $g$ extending into the filling. This prevents lateral movement of the band. Other corrugations might be put in the band, so long as its general shape is not departed from. I also show the edges of the band bent slightly to conform to the sides of the tire. This is only to prevent the band from cutting into the tire along its edges and is not a necessary feature of the invention.

To prevent the overlapping ends of the sections of the band from passing each other too far, and at the same time to prevent them from separating, lugs $f'$ are formed in one of the ends, which overlap the opposing strip or section and form stops, as will be obvious. In the drawings the envelop confining the metal band is represented by $f^2$.

Having thus described my invention, I claim—

In a pneumatic tire, a puncture-proof structure consisting of a filling of puncture-proof material placed inside of the tire and against the tread, in combination with a flat metal band placed against the filling and having a longitudinal rib extending into the filling for the purpose of preventing lateral movement of the band, substantially as described.

In testimony whereof I subscribe my signature in presence of two witnesses.

ABRAM L. SMITH.

Witnesses:
FRANK S. OBER,
WM. A. ROSENBAUM.